No Printed Specification Available
877X
J. Reed,
Cutting Dye Wood.
Patented June 3, 1808.
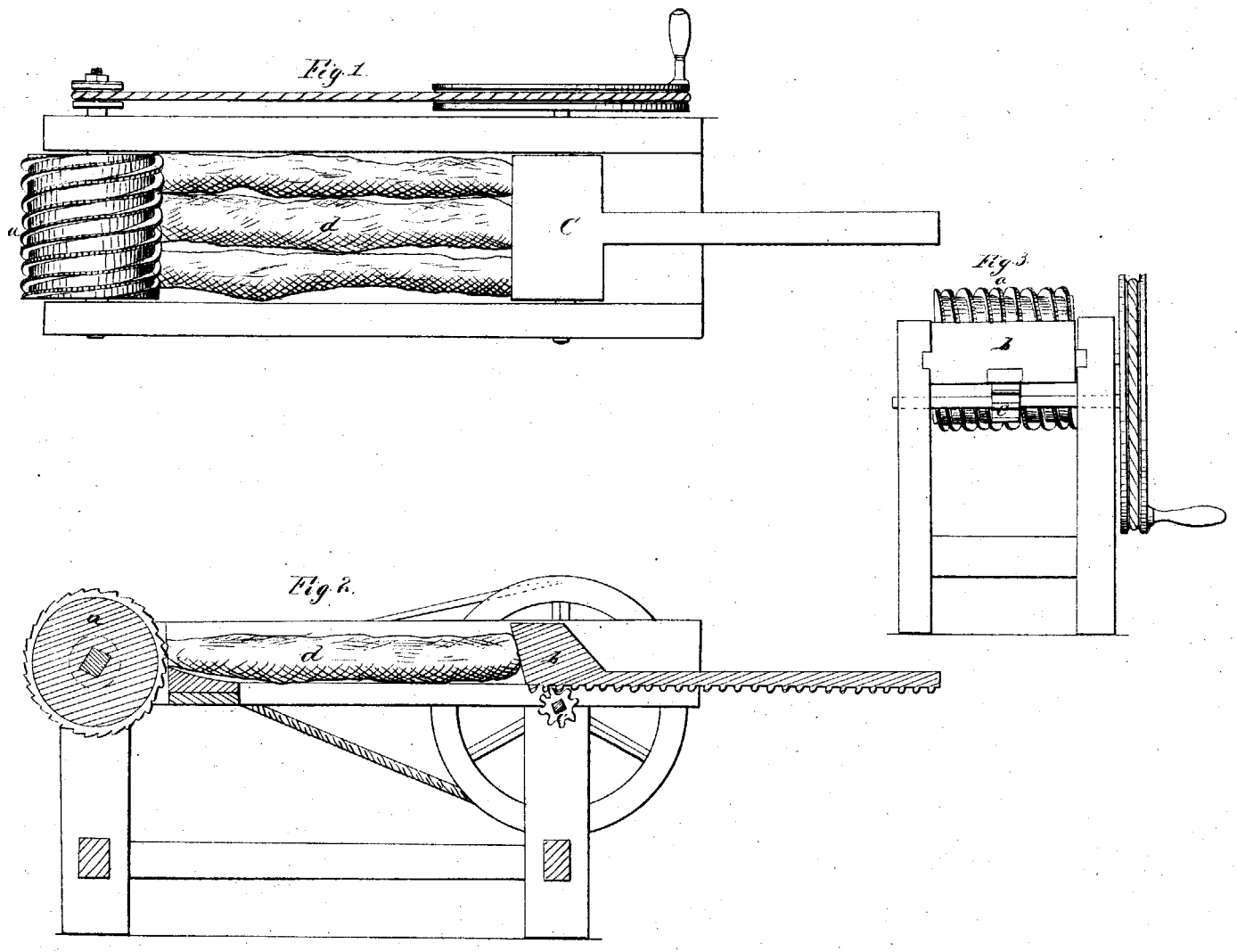
AM. PHOTO-LITHO. CO. N.Y. (OSBORNE'S PROCESS)

Jesse Reed 877X

Letters Patent
Issued June 3, 1808.

The Schedule referred to in these Letters Patent and making part of the same containing a description in the words of the said Jesse [illegible] himself of his - Machine for [illegible] Dye woods The principal parts of the machine consist of a rolling saw, a carriage and a rest — The rolling saw is fixed on the surface or circumference of a wheel winding in a spiral direction or in manner of a screw round the wheel so that as it performs a rolling motion it advances with its edge across the end of the wood, or the saw may be fixed on the end surface of the wheel contracting towards the centre but progressing outward on the rest. The carriage is for the purpose of conducting the wood as it is fed. The rest is for the purpose of supporting the end of the wood against the pressure of the saw — The manner which is supposed to be most convenient in conducting the feed is performed by a ratchet wheel and cogs advancing the stick of wood in a parallel direction with the cut or at right Angles with the face of the saw.

Witnesses
Benj. [illegible] Gilman
[illegible] Gilman

Jesse Reed

[illegible]

(208 words)